United States Patent [19]
Meador et al.

[11] Patent Number: 5,953,640
[45] Date of Patent: Sep. 14, 1999

[54] CONFIGURATION SINGLE CHIP RECEIVER INTEGRATED CIRCUIT ARCHITECTURE

[75] Inventors: Richard B. Meador, Sunrise, Fla.; Kenneth A. Hansen, Round Rock, Tex.; Walter H. Kehler, Sunrise, Fla.; Gary A. Kurtzman, Austin, Tex.; Rajesh H. Zele, Plantation, Fla.

[73] Assignee: Motorola, Inc., Schaumburg, Ill.

[21] Appl. No.: 08/847,648

[22] Filed: Apr. 30, 1997

[51] Int. Cl.$^6$ .................................................. H04B 1/38
[52] U.S. Cl. .......................... 455/73; 455/333; 455/84; 455/260
[58] Field of Search .................................. 455/73, 75, 76, 455/8, 333, 324, 85, 87, 260, 265, 317, 318

[56] References Cited

U.S. PATENT DOCUMENTS

| | | | |
|---|---|---|---|
| 4,052,672 | 10/1977 | Enderby et al. | 325/147 |
| 4,153,877 | 5/1979 | Fathauer et al. | 455/76 |
| 4,254,382 | 3/1981 | Keller et al. | 331/116 |
| 4,510,611 | 4/1985 | Dougherty | 375/222 |
| 4,653,117 | 3/1987 | Heck | 455/260 |
| 4,726,069 | 2/1988 | Stevenson | 455/46 |
| 5,584,062 | 12/1996 | Meador et al. | 455/260 |
| 5,606,731 | 2/1997 | Pace et al. | 455/324 |

*Primary Examiner*—Dwayne D Bost
*Assistant Examiner*—Tracey M. Legree
*Attorney, Agent, or Firm*—Andrew S. Fuller

[57] ABSTRACT

A single-chip transceiver integrated circuit (100) has multiple on-chip circuits that implement receiver functions, transmitter functions, and audio processing functions. The IC (100) has interfaces (220, 240, 252, 270, 260, 245, 288, 290) which are situated among the on-chip circuits, and which couple one on-chip circuit to another. At least some of these on-chip interfaces (220, 240, 245, 252, 270) are configurable to couple an off-chip processing circuit to substitute for a corresponding on-chip circuit. In the preferred embodiment, the single-chip transceiver IC (100) supports radio configurations having off-chip versions of corresponding on-chip circuits for performing receiver front-end functions, synthesizer functions, reference oscillator functions, and audio processing functions.

19 Claims, 5 Drawing Sheets

CONFIGURATION SINGLE CHIP RECEIVER INTEGRATED CIRCUIT ARCHITECTURE

TECHNICAL FIELD

This invention relates in general to radio transceivers, and more particularly, to integrated circuit devices that implement transceiver functions.

BACKGROUND

A radio transceiver is typically constructed using building blocks that implement receiver functions, transmitter functions, and audio processing functions, among others. Generally, these radio building blocks are implemented using multiple circuits, some having a high degree of integration. There has been a substantial effort to reduce the size and cost of radio transceivers. In this effort, significant portions of radio circuits have been integrated, and made available as custom chip sets which perform a particular function. Custom chip sets allow a radio designer to take advantage of the substantial cost savings available when the chip sets are mass produced. However, such cost savings tend to come at the price of flexibility in that the circuits are not easily changed without incurring a substantial cost in the design and manufacture of new custom chips. For example, if some circuits are satisfactory while others are not, a redesign of the custom chip is typically necessary.

There has been a desire to integrate as many functions as feasible on a single integrated circuit when implementing a radio transceiver. An entire transceiver system integrated on a common substrate would tend to reduce cost and increase reliability. However, difficulty in designing and integrating appropriate circuits has limited practical implementations. Preferably, an integrated transceiver system should be designed to allow for some flexibility in improving performance and functionality. Therefore, a configurable single-chip radio transceiver is needed.

DETAILED DESCRIPTION OF THE PREFERRED EMBODIMENT

The present invention provides for a configurable single-chip transceiver integrated circuit (IC) architecture. The single-chip transceiver IC has multiple on-chip circuits that implement receiver functions, transmitter functions, and audio processing functions, among others. The IC has interfaces which are situated among the on-chip circuits, and which interfaces that couple one on-chip circuit to another. At least some of these on-chip interfaces are configurable to couple an off-chip processing circuit to substitute for a corresponding on-chip circuit. In the preferred embodiment, the single-chip transceiver IC supports radio configurations having off-chip implementations of corresponding on-chip circuits for performing receiver front-end functions, synthesizer functions, reference oscillator functions, and audio processing functions.

Figure 1A:
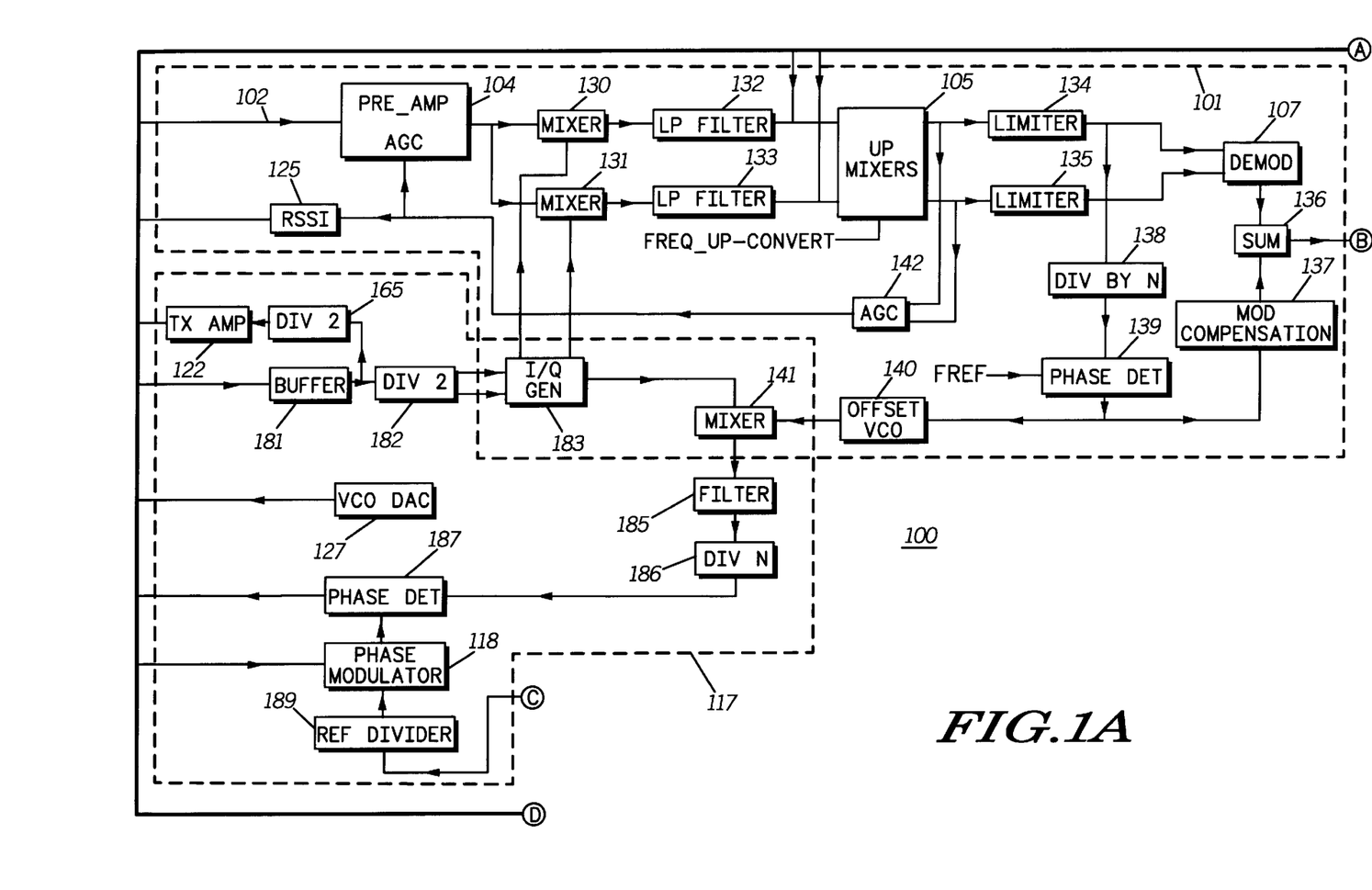
FIG. 1A and FIG. 1B represent a block diagram of a single-chip transceiver integrated circuit architecture, in accordance with the present invention.
Figure 1B:
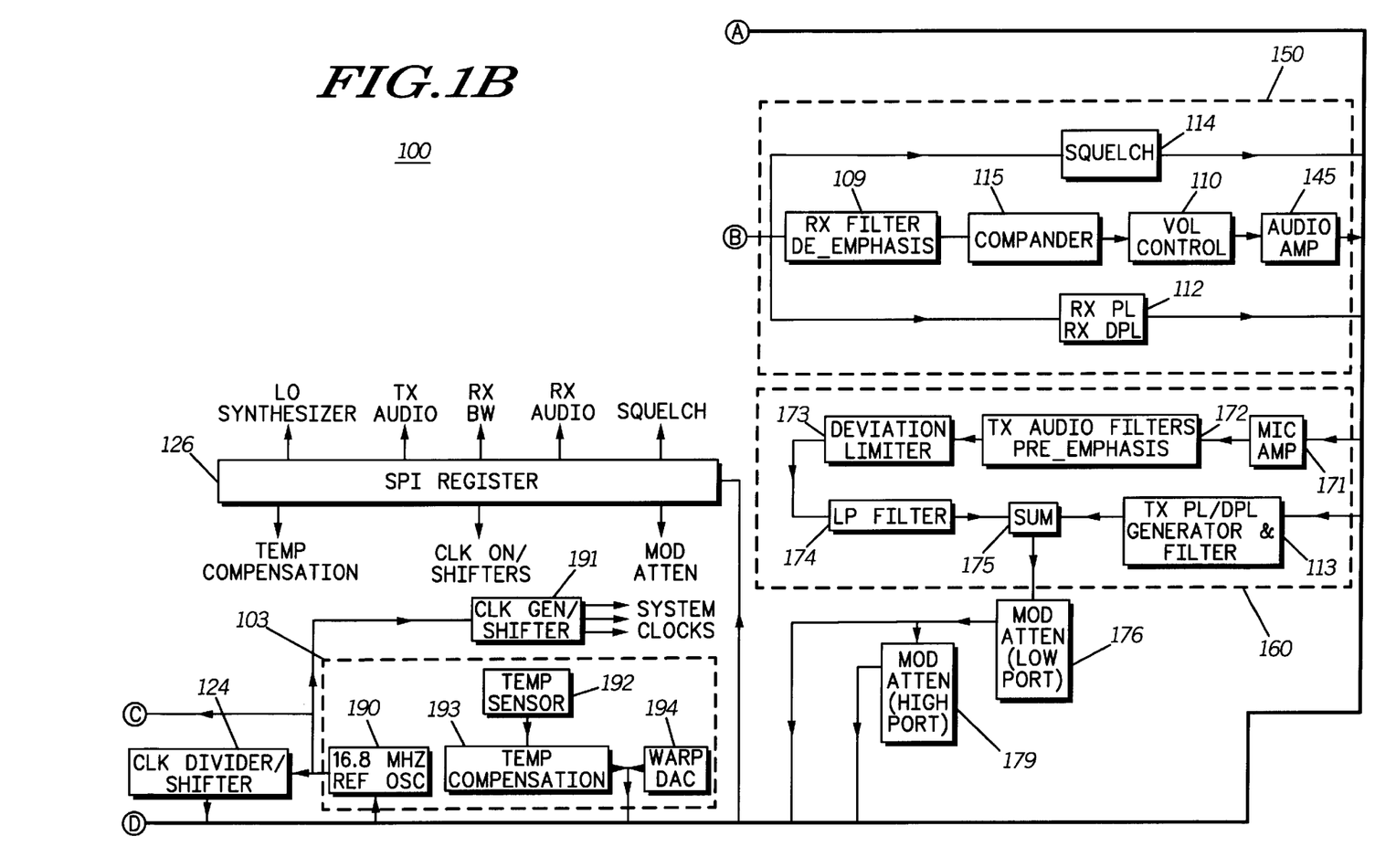

FIG. 1A and FIG. 1B represent a block diagram of significant portions of a single-chip transceiver IC (SCT IC) 100, in accordance with the present invention. The SCT IC 100 includes blocks that implement a direct conversion receiver 101, an integer local oscillator (LO) synthesizer 117, a reference oscillator and associated temperature compensation circuitry 103, and an audio processing block that includes receive audio circuitry 150, and transmit audio circuitry 160. The SCT IC 100 also includes a serial port interface (SPI) register 126 that facilitates programming from an external source, such as a microprocessor.

The direct conversion receiver 101 operates on an incoming radio frequency (RF) signal 102, preferably having a frequency range of 40 MHz to 600 MHz. The incoming RF signal 102 provides an input to an RF pre-amplifier stage 104. The RF pre-amplifier stage 104 provides low noise amplification and uses input from an automatic gain control (AGC) circuit 142. The output of the pre-amplifier stage 104 provides an input to down conversion mixers 130, 131. Preferably, the output of one mixer 131 is 90 degrees phase shifted from the output of the other mixer 130. The down converted signals are filtered by low-pass filters 132, 133. In the preferred embodiment, the filter has a bandwidth that is programmable via the SPI register 126. The filtered output of the low-pass filters 132, 133 provides an input to an up conversion stage 105 which converts the baseband signals to frequency translated in-phase (I) and quadrature (Q) signals that form inputs to limiters 134, 135. Additionally, the outputs from the up conversion mixers 105 are used to generate an AGC signal and a receive signal strength indicator (RSSI) signal 125. The AGC circuit 142 is used to prevent a strong on-channel signal from overloading the receiver. As an indicator of the on-channel carrier strength, the RSSI 125 provides an off-chip output which may be used for monitoring purposes. The baseband signals are also provided for off-chip use. The outputs from the limiters 134, 135 provide inputs to a frequency modulation (FM) demodulator 107. The demodulator 107 provides an output signal that is proportional to the frequency deviation of its input signals. The output signal from the demodulator 107 is coupled to a summer 136, which sums the demodulated signal with an input from a modulation compensation block 137 to provide an audio signal with a substantially flat frequency response. For the receiver 101, the summing of the signals is useful because the LO synthesizer 117 may be programmed to track the frequency of the incoming RF signal. The tracking is implemented with a divide-by-N block 138, a tracking phase detector 139, a tracking VCO 140, and a tracking mixer 141. The tracking of the RF input signal and the summing of the signals are described in more detail in U.S. Pat. No. 5,584,062, issued to Meador et al. on Dec. 10, 1996 for a Method and Apparatus for Compensating Phase Locked Receivers, the entire contents of which are hereby incorporated by reference.

The demodulated signal from the summer 136 provides input to the receive audio circuitry 150. In the receive audio circuitry 150, a receiver filter 109 is coupled to the demodulated signal from the summer 136. The receiver filter 109 provides FM de-emphasis and filtering of the demodulated signal at frequencies in the audio range. The output of receiver filter 109 provides input to a compander 115. The compander 115 provides gain reduction to low-level noise and spurious signals. The output from compander 115 provides an input to a volume control block 110, which is implemented with a programmable resistive attenuator. The volume control block 110 is programmed via the SPI register 126. The output of the volume control block 110 provides an input to an audio amplifier stage 145, which outputs an amplified signal to drive an external audio power amplifier or a high impedance speaker. The receive audio circuitry also includes a squelch stage 114, and a receive private line / digital private line (PL/DPL) stage 112. The squelch stage 114 provides an indicator of channel activity, and the receive PL/DPL stage 112 is used to filter and condition low frequency signaling tones that may be present at the output of the summer 136.

The LO signal for the receiver 101 is generated from a voltage controlled oscillator (VCO). In the preferred embodiment, the VCO is implemented off-chip, but may be alternatively implemented on-chip as necessary. When the transceiver IC 100 operates in receive mode, a VCO signal 180 is processed through a buffer 181, and the buffered signal processed through a divide-by-2 stage 182. The divide-by-2 stage 182 operates with an I/Q generator 183 to generate two signals of the same amplitude but 90 degrees out of phase. The I and Q signals from the I/Q generator 183 provide inputs to the mixers 130, 131.

The output signal from the I/Q generator 183 is also input to an image canceling mixer 141 where the signal is mixed with the output signal from a tracking VCO 140. The frequency at the output of the I/Q generator can be represented as $F_{LO}$. The frequency of the output signal from the tracking VCO can be represented as $F_{TRACK}$. The image canceling mixer 141 attenuates the mixer component at $F_{LO}+F_{TRACK}$ so that the mixer output signal can be represented as $F_{LO}-F_{TRACK}$. An additional filter stage 185 located at the output of the mixer 141 attenuates the remaining intermodulation components in the mixer output signal. These components are usually much higher in frequency then the desired frequency.

The signal at the output of filter stage 185 forms an input to a divide-by-N stage 186. The divide-by-N stage 186 is programmed by control lines (not shown) that interface with SPI register 126. The output of the divide-by-N stage 186 is input to a LO phase detector stage 187, where it is compared with reference signal of the LO synthesizer 117. The output signal from the phase detector 187 is then supplied to an off-chip loop filter for processing by the off-chip VCO. In the receive mode, the output signal from an LO reference divider stage 189 provides an input to a phase detector 187, bypassing phase modulator 118. In the transmit mode, the LO synthesizer 117 is programmed to enable FM modulation of an RF signal for transmission. Control lines (not shown) from the SPI register 126 activate a transmit audio stage 160, a transmit divide-by-2 stage 165, a phase modulator 118, and transmit amplifier 122. In transmit mode, the receiver circuits and the receive audio stage 150 are disabled to reduce current drain and to avoid unwanted interference.

For transmit operations, a voice signal 170 from a microphone provides an input to a microphone amplifier stage 171. The amplified output signal provides an input to a transmit audio filter stage 172 that provides low-pass filtering, high-pass filtering, and pre-emphasis filtering functions. The filtering provides attenuation to signals outside the audio range. The signal at the output of the transmit audio filter stage 172 provides an input to a deviation limiter 173. The deviation limiter 173 prevents strong audio signals from distorting the transmit modulation signal. The output of the deviation limiter 173 is filtered by a low-pass filter 174 which preferably has a corner frequency above the voice range. A summer 175 combines the modulated voice signal from the filter 174 with filtered PL, DPL, and data signals output from a transmit PL/DPL generator stage 113. The signal provided to the transmit PL/DPL generator 113 is typically supplied by an off-chip microcontroller. The combined signal at the output of the summer 175 is input to the low-port and high-port modulation attenuators 176, 177. The modulation attenuators are adjustable via the SPI register 126. The output of the low-port attenuator 176 is applied to the input of the high-port modulator 177. The purpose of the dual modulation attenuators is to provide a means of adjusting the deviation level of the modulating signals applied to the LO synthesizer 117.

The LO synthesizer 117 is configured for dual-port modulation as a means of providing a transmit deviation level that is constant over frequency referenced to the modulating signal's input to the LO synthesizer 117. The output of the low-port attenuator 176 is processed and applied to the phase modulator 118. Modulation of the reference path of the LO synthesizer 117 provides a modulation means for low frequency signals. Higher frequency signals are attenuated by the frequency response of the LO synthesizer 117. The output of the high-port attenuator 177 is used by the VCO for modulation. This modulation technique is described by U.S. Pat. No. 4,052,672, issued to Enerby et al. on Oct. 4, 1977, for an Extended Phase-Range, High Fidelity Modulator Arrangement, the entire contents of which are hereby incorporated by reference.

When in transmit mode, the VCO signal 180 provides an input to the buffer 181. The buffered signal provides an input to the divide-by-2 stage 165 and an input to a transmit amplifier stage 122. The output of the transmit amplifier stage 122 can be used to supply a signal to a radio antenna or to an additional power amplifier stage if required.

In the receive and transmit modes, the reference signals for the system clocks, including the LO synthesizer are generated by the reference oscillator and temperature compensation stage 103. In the preferred embodiment, the reference oscillator stage 190 provides a highly stable 16.8 MHz +/-2.5 ppm signal from -30 degrees Celsius to 80 degrees Celsius. A temperature sensor 192 and a temperature compensation stage 193 are used to generate a temperature varying control voltage that is used to temperature compensate crystal reference oscillator 190, and also provided as an off-chip interface. The temperature sensor 192 provides a linear voltage over temperature and provides an input to the compensation stage 193. Preferably, the compensation stage 193 has a middle range circuit for providing a linear output voltage versus temperature near room temperature, a cold temperature range circuit for providing a non-linear voltage versus temperature over a predetermined cold temperature range and a hot temperature range circuit for providing a non-linear voltage versus temperature over a pre-determined hot temperature range. The temperature dependent voltage from temperature compensation stage 193 is summed with the output voltage of a digital to analog (D/A) converter 194 that is used to adjust the reference oscillator 190 to its nominal frequency at room-temperature. The temperature compensation technique is described in U.S. Pat. No. 4,254, 382, issued to Keller et al. on Mar. 3, 1981 for a Crystal Oscillator Temperature Compensation Circuit, the entire contents of which are hereby incorporated by reference.

In the preferred embodiment, the reference oscillator 190 outputs a 16.8 megahertz (MHz) signal that provides an input to a clock divider stage 124. The clock divider stage 124 is controlled by the SPI interface 126 and is used to generate a stable clock signal for an external microcontroller. The frequency of the clock signal may be shifted by small amounts to avoid circuit crosstalk that would otherwise adversely affect the operation of the transceiver circuits. The 16.8 MHz signal is also input to the system clock generator which provides the clocks for the transmit and receive filter stages and the up conversion signal for up conversion stage 105.

In the preferred embodiment, the SPI register 126 is a 146 bit serial shift register that provides programming control of the LO synthesizer 117, the direct conversion receiver 101, the reference oscillator and temperature compensation 103, the receive audio 150, and the transmit audio 160.

Figure 2:
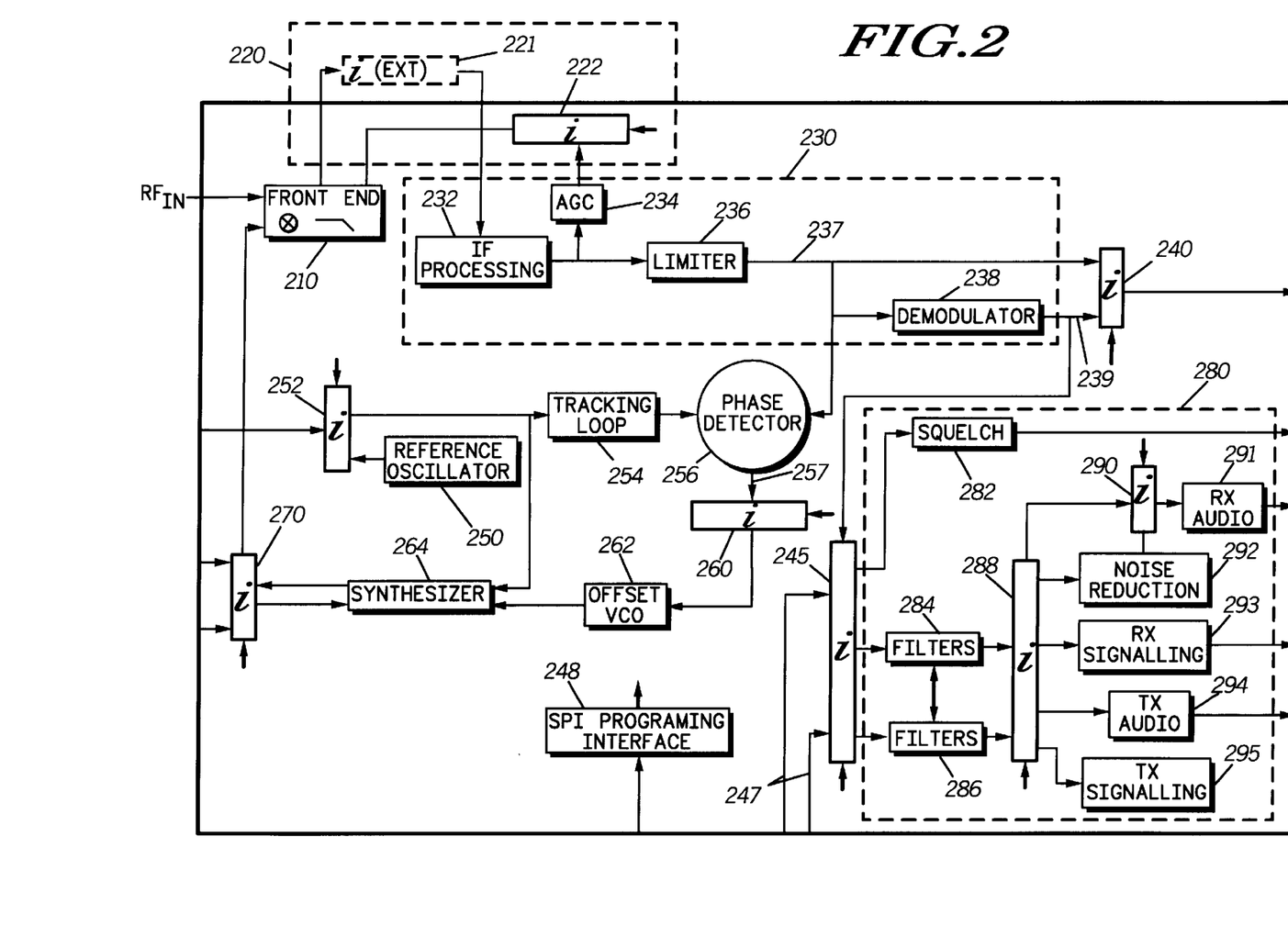
FIG. 2 is a simplified block diagram of the single-chip transceiver integrated circuit architecture highlighting interfaces for configurability, in accordance with the present invention.

FIG. 2 is a block diagram of the single-chip transceiver integrated circuit 100 highlighting functional blocks and interfaces for configurability, in accordance with the present invention. A receiver front-end block 210 includes amplification, filtering, and mixing components for processing radio frequency signals, typically sourced at an antenna, to generate baseband signals. In the preferred embodiment, the receiver front-end block includes the RF amplifier 104, filters 132, 133, and down mixers 130, 131, among other components. The receiver front-end block 210 is coupled to a receiver back-end block 230. The receiver back-end block 230 includes an intermediate frequency processing block 232, an automatic gain control circuit (AGC) 234, a limiter 236 and a demodulator 238. The intermediate frequency processing block 232 includes up-mixers as required. The intermediate frequency processing block 232 is coupled to the AGC 234 and to the limiter 236 which in turn is coupled to the demodulator 238. The receiver front-end block 210 is coupled to the receiver back-end block 230 through an interface that provides selective coupling of the automatic gain controller circuit 234 to the receiver front-end 210, and that provides an off-chip interface to support substitution of an off-chip receiver front-end for the on-chip receiver front-end block 210. The external front-end interface 220 includes a configurable on-chip portion 222 that provides an off-chip interface 221 for the output of the automatic gain control block 234. The signal output from the AGC 234 is selectively coupled to the receiver front-end block through the interface portion 222. Another portion of the interface 220 provides off-chip interfaces that support off-chip hardware coupling between the receiver front-end block and the receiver back-end block. In the preferred embodiment, off-chip capacitors provide the hardware coupling between the receiver front-end 210 and the receiver back-end 230.

The demodulator 238 provides a demodulated signal 239 as an output. A receiver output interface 240 has as inputs the output 237 of the limiter and the demodulated signal 239 from the demodulator 238. The receiver output interface 240 is configurable to select between the output of the limiter 236 and the demodulated signal 239 to provide an off-chip signal.

A reference oscillator 250 is included on-chip to provide a master clock for various circuitry. The transceiver IC 100 further includes an interface 252 that supports an optional external reference oscillator. The reference oscillator interface 252 is configurable to selectively couple either the on-chip reference oscillator block 250, or, in the alternative, an off-chip reference oscillator source circuit to a synthesizer block 264 and to other circuitry. A tracking loop 254 is coupled to the reference oscillator interface 252, and is in turn coupled to a phase detector 256. The phase detector is coupled to the limiter output 237 of the receiver back-end block 230, and an output from the phase detector 257 coupled to a phase detector interface 260. The phase detector interface 260 selectively couples the output of the phase detector 257 to an offset voltage control oscillator block 262. The offset VCO 262 is coupled to the synthesizer 264. The synthesizer 264 is coupled to the receiver front-end 210 through a synthesizer interface 270. The synthesizer interface 270 is configurable to couple the receiver front-end block to the on-chip synthesizer block 264 or, in the alternative to an off-chip synthesizer source. The receiver back-end 230 is coupled to an audio processing block 280 through an audio processing interface 245. In the preferred embodiment, the audio processing block 280 is configurable to provide transmit and receive audio processing. The interface 245 has off-chip connectors and is configurable for receive and transmit modes. When in receive mode, the interface is configurable in on-chip and off-chip modes. When in on-chip mode, the interface 245 couples signals from the receiver back-end block 230 to the audio processing block 280. When in off-chip mode, the interface 245 couples signals from the off-chip connectors 247 to the audio processing block 280.

In the audio processing block 280 a squelch circuit 282 provides basic audio output control of carrier based signals. Programmable audio filters 284 are configurable for reuse in both receive and transmit modes. When in transmit mode, the filters 284, 286 are configured for processing transmit audio. When in receive mode the filters 284, 286, are configured for processing receive audio. The audio processing block 280 further includes a noise reduction circuit 292, a receive signaling circuit 293, a transmit audio circuit 294 and a transmit signaling circuit 295. A configurable interface 288 provides interconnection with the filters 284, 286. A noise reduction interface 290 is configurable to couple or decouple the noise reduction circuit 292 to a receive audio circuit 291.

The various configurable interfaces 220,240, 252, 270, 260, 245, 288, and 290, are preferably coupled to a programming interface bus 248, and are microprocessor controlled.

Thus, the configurable single-chip transceiver IC includes at least three on-chip circuits that implement receiver functions, transmitter functions, and audio processing functions. The IC further includes interfaces that have off-chip connections and which are configurable to couple one on-chip circuit to another, or to couple an off-chip processing circuit that substitutes for one of the on-chip circuits.

Figure 3:
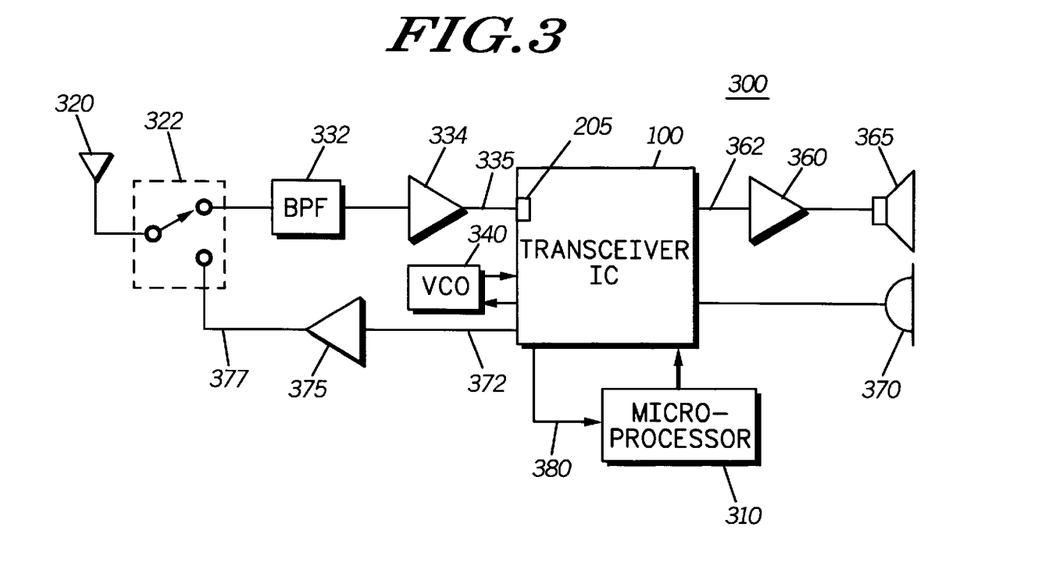
FIG. 3 is a block diagram showing a first radio configuration that utilizes the single-chip transceiver integrated circuit, in accordance with the present invention.

FIG. 3 is a block diagram of a radio configuration 300 that utilizes the single-chip transceiver integrated circuit, in accordance with the present invention. The radio includes the single-chip receiver IC 100, which is coupled to a microprocessor controller 310 that provides overall operational control of the radio. The radio further includes an antenna 320 which is coupled to an antenna switch 322. The antenna switch 322 is coupled to a receive path, which includes the band pass filter 332 and a receiver amplifier 334. The receiver amplifier 334 provides an RF input signal 335 to the RF input port 205 of the IC 100. An off-chip VCO 340 is also coupled to the IC 100. For audio output purposes, an audio power amplifier 360 couples an audio signal 362 from the IC 100 to a speaker 365. For transmit purposes a microphone 370 is coupled to the IC 100, a transmit signal 372 is coupled from the IC 100 to a transmitter power amplifier 375. An amplified signal 377 from the transmitter power amplifier 375 is coupled via the antenna switch 322 to the antenna 320. The microprocessor controller 310 has a clock input 380 from the IC 100 and provides control of radio operation.

Figure 4:
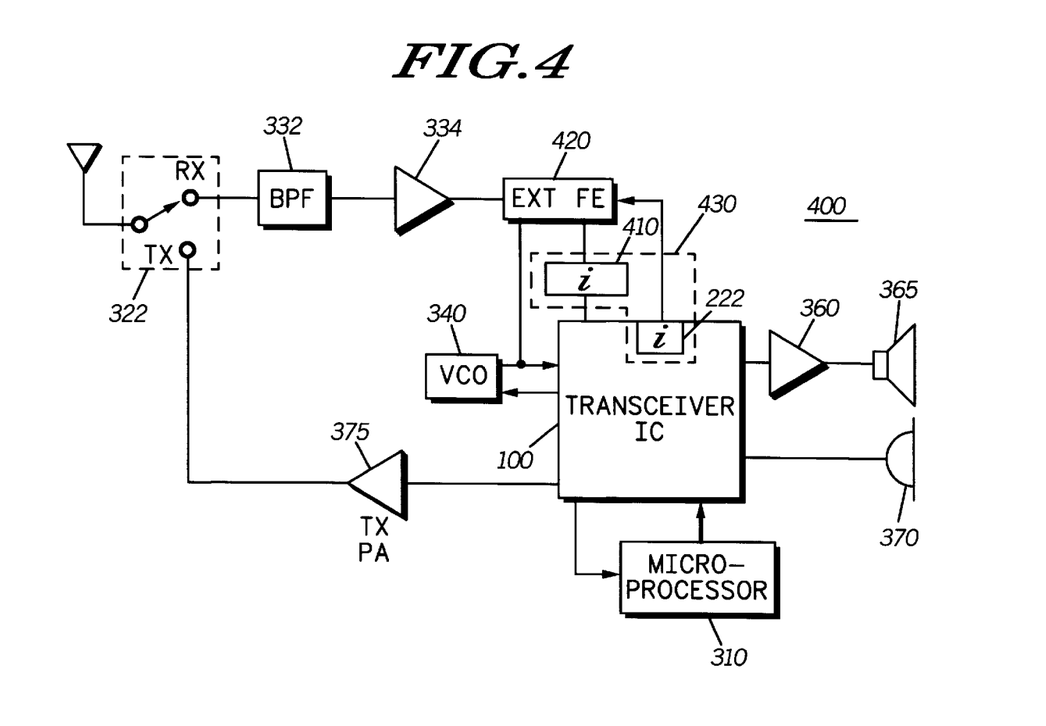
FIG. 4 is a block diagram showing a second radio configuration that utilizes the single-chip transceiver integrated circuit and a substitute external receiver front-end, in accordance with the present invention.

FIG. 4 is a block diagram of an alternative radio configuration 400 in which off-chip receiver front-end circuitry is substituted for the receiver front-end block of the IC. Otherwise, the configuration is as described with respect to FIG. 3. In this configuration, off-chip (external) receiver front-end circuitry 420 is coupled is coupled to the VCO 340, and through an interface 430 to the transceiver IC 100. The interface 430 includes the AGC interface 222, that couples the output of the AGC to the front-end circuitry 420, and a hardware interface 410 that provides radio frequency signals to the on-chip receiver back-end circuitry. With this configuration, improved performance may be realized by substituting an external receiver front-end for the on-chip receiver front-end block.

Figure 5:
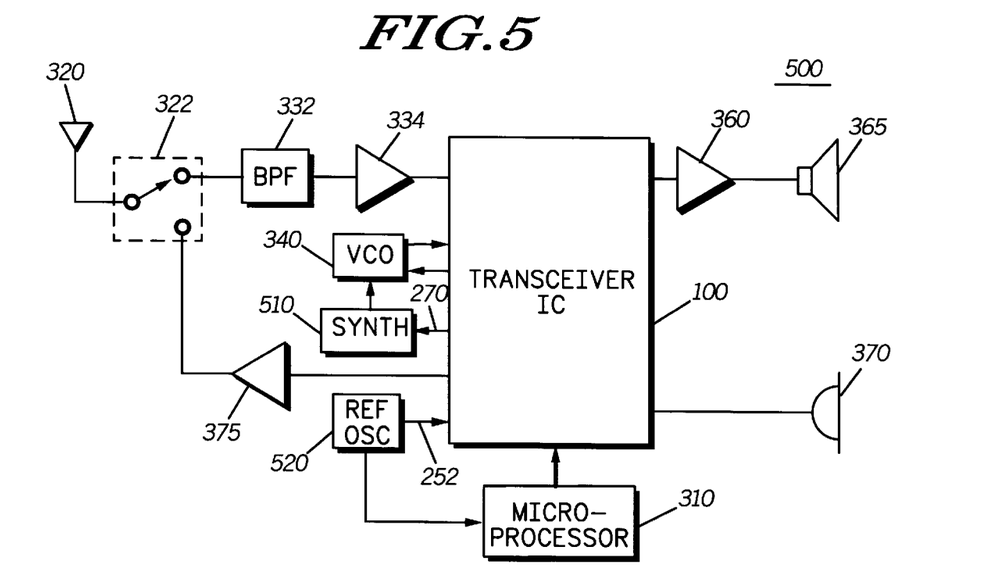
FIG. 5 is a block diagram showing a third radio configuration that utilizes the single-chip transceiver integrated circuit, a substitute external synthesizer, and a substitute reference oscillator, in accordance with the present invention.

FIG. 5 is a block diagram of a second alternative radio configuration 500 that utilizes the single-chip transceiver integrated circuit, a substitute external synthesizer, and a substitute reference oscillator, in accordance with the present invention. Otherwise, the configuration is as described with respect to FIG. 3. In this configuration, an off-chip synthesizer 510 is coupled through the synthesizer interface 270 to substitute for the on-chip synthesizer. The off-chip synthesizer 510 is also coupled to the VCO 340. Additionally, an off-chip reference oscillator 520 is coupled to the IC 100 through the reference oscillator interface 252 to substitute for the on-chip reference oscillator. This configuration offers flexibility in improving overall radio performance.

Figure 6:
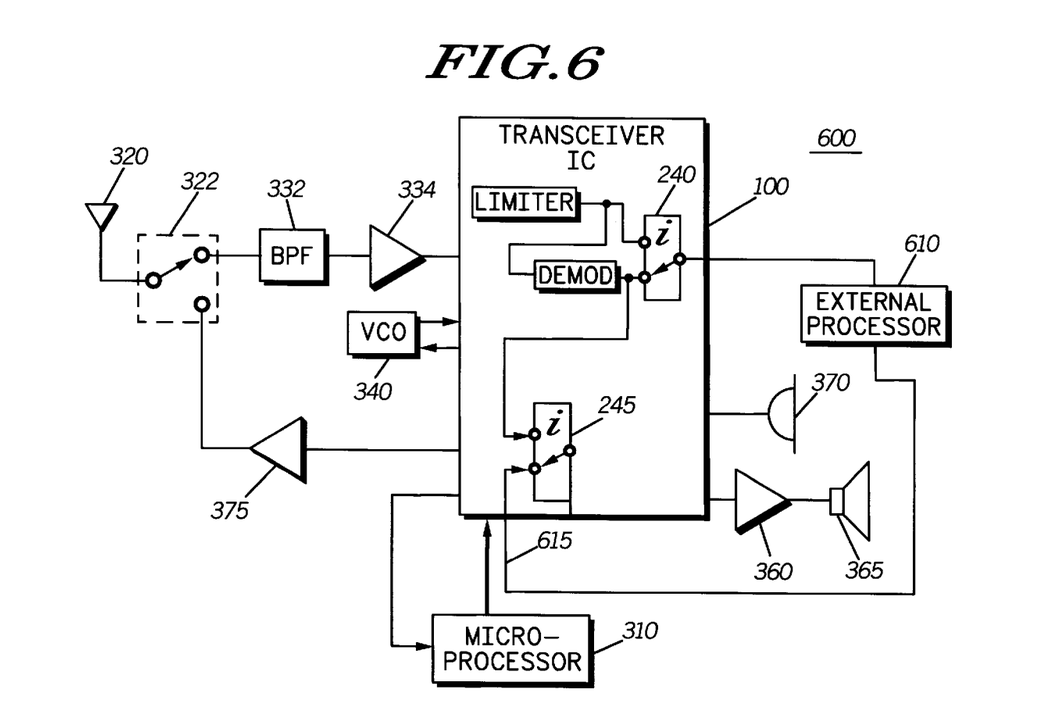
FIG. 6 is a block diagram showing a fourth radio configuration that utilizes the single-chip transceiver integrated circuit, and external audio processing, in accordance with the present invention.

FIG. 6 is a block diagram showing a fourth radio configuration that utilizes the single-chip transceiver integrated circuit, and external audio processing, in accordance with the present invention. Otherwise, the configuration is as described with respect to FIG. 3. Here, the interface 240 is configured to select the demodulated signal, as output from the receiver back-end, and to present this signal to an external processing circuit 610. The audio processing interface 245 is configured to couple an off-chip signal 615 from the external processing circuit 610 to the audio processing circuit 280 for further processing.

In the preferred embodiment, the SCT IC provides the receive and transmit functions required for a multiple channel radio on a single silicon substrate. The SCT IC utilizes a direct conversion receiver and a high resolution LO synthesizer which features dual-port modulation and a highly stable reference oscillator with on-chip temperature compensation. Radio controls such as volume control, squelch adjust, reference oscillator warp, transmit deviation, modulation balance, and LO center frequency adjustment are integrated.

The present invention offers significant advantages over the prior art. A substantially complete radio transceiver system is integrated on a common substrate through a novel combination of circuits. Further, significant flexibility is built into the design that would tend to reduce cost and increase reliability for practical radio implementations. The resultant integrated transceiver system allows for flexibility in improving performance and functionality.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A configurable single-chip transceiver integrated circuit, comprising:

a receiver front-end block comprising an amplifier, a filter, and a mixer, all coupled together;

a receiver back-end block comprising an automatic gain control circuit;

a first interface that provides selective coupling of the automatic gain control circuit of the receiver back-end block to the receiver front-end block, and that provides an off-chip interface to support substitution of an off-chip receiver front-end for the receiver front-end block;

a synthesizer block;

a second interface that is configurable to couple the receiver front-end block to the synthesizer block or, in the alternative, to an off-chip synthesizer source;

a reference oscillator block;

a third interface that is configurable to couple the synthesizer block to the reference oscillator block or, in the alternative, to an off-chip reference oscillator source;

a fourth interface that is coupled to the receiver back-end block and that provides a receiver signal for off-chip use;

an audio processing block that is configurable to provide transmit and receive audio processing; and a fifth interface that is configurable to couple the audio processing block to the receiver back-end block, or in the alternative, to an off-chip signal source.

2. The configurable single-chip transceiver integrated circuit of claim 1, wherein the receiver front-end block and the receiver back-end block have off-chip interfaces that support off-chip hardware coupling therebetween.

3. The configurable single-chip transceiver integrated circuit of claim 1, wherein the audio processing block comprises:

a noise reduction circuit; and a sixth interface that is configurable to couple or decouple the noise reduction circuit.

4. The configurable single-chip transceiver integrated circuit of claim 1, further comprising a programming interface bus coupled to the first, second, third, fourth, and fifth interfaces.

5. The configurable single-chip transceiver integrated circuit of claim 4, wherein the first, second, third, fourth, and fifth interfaces are microprocessor controlled.

6. A radio, comprising:

a configurable single-chip transceiver integrated circuit, comprising:

a receiver front-end block, comprising a radio frequency amplifier, an radio frequency filter, and a down mixer, all coupled together, the receiver front-end block;

a receiver back-end block, comprising an automatic gain control block having an output selectively coupled to the receiver front-end block;

a first interface that couples the receiver front-end block to the receiver back-end block, and that provides an interface for an off-chip receiver front-end; and a second interface that provides an off-chip interface for the output of the automatic gain control block.

7. The radio of claim 6, further comprising receiver front-end circuitry, that is distinct from the configurable single-chip transceiver integrated circuit, which receiver front-end circuitry is coupled to the first interface and to the output of the automatic gain control through the second interface.

8. The radio of claim 6, further comprising:

an audio processing block; and an interface coupled to the audio processing block and to the receiver back-end block, the interface having off-chip connectors, and being configurable for receive and transmit modes, when in receive mode the interface is configurable in on-chip and off-chip modes, when in on-chip mode, the interface couples signals from the receiver back-end block to the audio processing block, and when in off-chip mode, the interface couples signals from the off-chip connectors to the audio processing block.

9. A radio, comprising:

a configurable single-chip transceiver integrated circuit, comprising:

a receiver front-end block, comprising a radio frequency amplifier, an radio frequency filter, and a down mixer, all coupled together, the receiver front-end block;

a receiver back-end block, comprising an automatic gain control block having an output selectively coupled to the receiver front-end block, wherein the receiver back-end block, comprises:

a limiter having an output;

a demodulator coupled to the output of the limiter, and providing a demodulated signal; and a third interface having as inputs the output of the limiter and the demodulated signal, the first interface being configurable to select between the output of the limiter and the demodulated signal to provide an off-chip signal;

a first interface that couples the receiver front-end block to the receiver back-end block, and that provides an interface for an off-chip receiver front-end; and a second interface that provides an off-chip interface for the output of the automatic gain control block.

10. A radio, comprising:

a configurable single-chip transceiver integrated circuit, comprising:

a receiver portion comprising a demodulator;

an audio processing block; and an interface coupled to the audio processing block and to the receiver portion, the interface having off-chip connectors, and being configurable for receive and transmit modes, when in receive mode the interface is configurable in on-chip and off-chip modes, when in on-chip mode, the interface couples signals from the receiver portion to the audio processing block, and when in off-chip mode, the interface couples signals from the off-chip connectors to the audio processing block.

11. The radio of claim 10, wherein the audio processing block has audio filters that are reused for both receive and transmit modes.

12. A configurable single-chip transceiver integrated circuit, comprising:

at least three on-chip circuits that implement receiver functions, transmitter functions, and audio processing functions; and at least two interfaces having off-chip connections, each of the at least two interfaces being configurable to couple one of the at least three on-chip circuits to another of the at least three on-chip circuits, each of the at least two interfaces being configurable to couple an off-chip processing circuit that substitutes for one of the at least three on-chip circuits.

13. The configurable single-chip transceiver integrated circuit of claim 12, wherein one of the at least three on-chip circuits implements a receiver front-end, comprising a radio frequency amplifier, a down mixer, and a baseband filter all coupled together.

14. The configurable single-chip transceiver integrated circuit of claim 12, wherein one of the at least three on-chip circuits implements an automatic gain control circuit that has an output signal path coupled to one of the at least two interfaces and made available for off-chip use.

15. The configurable single-chip transceiver integrated circuit of claim 12, wherein one of the at least three on-chip circuits implements an audio processing block that is configurable to operate in receive or transmit mode.

16. The configurable single-chip transceiver integrated circuit of claim 12, wherein one of the at least three on-chip circuits implements a synthesizer, and one of the at least two interfaces is configurable to couple a substitute off-chip synthesizer circuit.

17. The configurable single-chip transceiver integrated circuit of claim 12, wherein one of the at least three on-chip circuits implements a reference oscillator, and one of the at least two interfaces is configurable to couple a substitute off-chip reference oscillator circuit.

18. A configurable single-chip transceiver integrated circuit, comprising:

at least three on-chip circuits that implement receiver functions, transmitter functions, and audio processing functions;

at least two interfaces having off-chip connections, each of the at least two interfaces being configurable to couple one of the at least three on-chip circuits to another of the at least three on-chip circuits, each of the at least two interfaces being configurable to couple an off-chip processing circuit that substitutes for one of the at least three on-chip circuits: and a programming interface bus coupled to the at least two interfaces and operable to provide a signal to switch configuration modes of any of the at least two interfaces.

19. The configurable single-chip transceiver integrated circuit of claim 18, wherein the at least two interfaces are microprocessor controlled.

* * * * *